D. Drawbaugh,
Molasses Gate.
№ 59,793.    Patented Nov. 20, 1866.
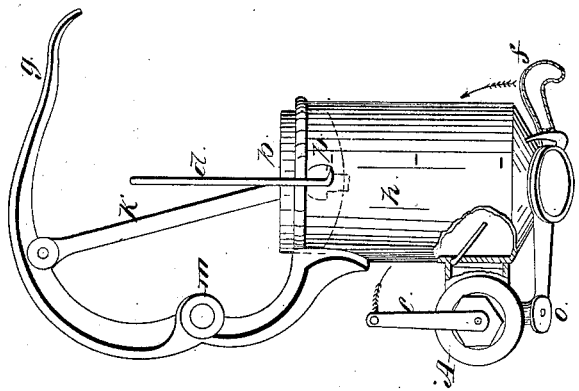
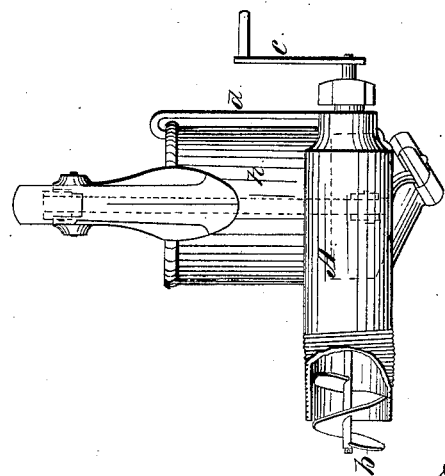
Witnesses
Edw Schofer
Henry Glocrton
Inventor;
Dan'l Drawbaugh
by
Mason, Fenwick & Lawrence

United States Patent Office.

IMPROVEMENT IN FAUCETS.

DANIEL DRAWBAUGH, OF EBERLY'S MILL, PENNSYLVANIA.

Letters Patent No. 59,793, dated November 20, 1866.

---

SPECIFICATION.

Be it known that I, DANIEL DRAWBAUGH, of Eberly's Mill, in the county of Cumberland, and State of Pennsylvania, have invented a new and useful Faucet for drawing molasses and other viscid liquids from the casks in which they are contained, and for measuring the same all in one operation, and I hereby declare the following to be a full, clear, and exact description thereof, which will be more fully understood by reference to the accompanying drawings, in which—

Figures 1 and 2 represent different views thereof, with portions of the external parts removed to exhibit more fully the internal structure.

$A$ is a spigot to be inserted into the cask, having an internal cylindrical aperture, in which a spiral flange, $b$, is worked by a crank, $c$, for the purpose of forcing the fluid in the cask through the spigot and through a passage into the vessel $h$, which is shown by the arrow in fig. 2. In this vessel is a piston, $p$, to which the piston rod, $k$, is attached, and also the measurer or indicator, $d$.

Figure 1 shows the faucet in the condition it should be when the operation of drawing off the liquid is commenced. The motion of the crank $c$ causes the spiral flange $b$ to revolve, forcing the viscid liquid in the cask through the spigot and the aperture in the vessel, opening the valve $i$, and lifting the piston in the vessel $h$ to a weight denoted by the indicator $d$. This shows, by the assistance of the marks on the outer side of the vessel $h$, the exact quantity of liquid contained in that vessel.

When the requisite quantity of liquid has thus been forced into the vessel $h$, the aperture in the bottom of that vessel is opened by swinging the gate $f$ around the pivot $o$. A pressure upon the lever $g$ causes it to force the piston downward in the vessel $h$, closing the flap valve $i$, and emptying the vessel $h$ of its entire contents. By this means molasses, tar, honey, or other like liquid can be drawn from a cask, and measured accurately as it is thus drawn.

Having thus described my invention, I wish it to be understood that I do not claim the spiral flange $b$, acting within a cylindrical spigot $A$, as such a contrivance has heretofore been used for a similar purpose; but what I do claim as new, and desire to secure by Letters Patent, is—

1. The combination of the screw flange $b$, spigot $A$, chamber $h$, and piston $p$, substantially as and for the purpose set forth.

2. I also claim, in combination with the above, an indicator $d$ attached to the piston $p$, and a proper scale on the outer side of the vessel $h$, by which to denote the exact amount of fluid within that vessel, substantially as and for the purpose described.

In witness whereof I have hereunto subscribed my name this 11th day of September, A. D. 1866.

DAN'L DRAWBAUGH.

Witnesses:
R. T. CAMPBELL,
HENRY SYLVESTER.